United States Patent [19]

Li

[11] 4,107,237

[45] Aug. 15, 1978

[54] RUBBER-MODIFIED ACRYLONITRILE-STYRENE-INDENE INTERPOLYMERS

[75] Inventor: George S. Li, Aurora, Ohio

[73] Assignee: The Standard Oil Company, Cleveland, Ohio

[21] Appl. No.: 769,509

[22] Filed: Feb. 17, 1977

[51] Int. Cl.² .......................................... C08F 279/02
[52] U.S. Cl. ................................................ 260/880 R
[58] Field of Search .................................... 260/880 R

[56] References Cited

U.S. PATENT DOCUMENTS

| | | | |
|---|---|---|---|
| 3,336,417 | 8/1967 | Sakuma | 260/880 R |
| 3,900,529 | 8/1975 | Beer | 260/880 R |
| 3,917,748 | 11/1975 | Vincent | 260/880 R |
| 3,947,527 | 3/1976 | Li | 260/880 R |
| 3,950,454 | 4/1976 | Hensley | 260/880 R |
| 3,959,411 | 5/1976 | Duke | 260/880 R |

*Primary Examiner*—Paul R. Michl
*Attorney, Agent, or Firm*—John F. Jones; Larry W. Evans

[57] ABSTRACT

Thermoplastic polymeric compositions having impact resistance, improved softening temperatures, and high strengths are composed of an olefinically unsaturated nitrile, such as acrylonitrile, a vinyl aromatic monomer, such as styrene, indene, and a preformed rubber such as a butadieneacrylonitrile copolymer.

8 Claims, No Drawings

RUBBER-MODIFIED ACRYLONITRILE-STYRENE-INDENE INTERPOLYMERS

The present invention relates to novel polymeric compositions which have good impact resistance, low permeability to gases, and high softening temperatures, and more particularly pertains to high softening, impact-resistant compositions which are composed of an olefinically unsaturated nitrile, a vinyl aromatic monomer, indene, and a preformed diene rubber, and to a process for preparing them.

The novel polymeric products of this invention are prepared by polymerization of an olefinically unsaturated nitrile, such as acrylonitrile, a vinyl aromatic monomer, such as styrene, and indene, in the presence of a preformed conjugated diene rubber.

The conjugated dienes useful in this invention include butadiene-1,3, isoprene, chloroprene, bromoprene, cyanoprene, 2,3-dimethyl butadiene, and the like. The most preferred are butadiene and isoprene because of their excellent polymerization properties.

The olefinically unsaturated nitriles useful in this invention are the alpha,beta-olefinically unsaturated mononitriles having the structure

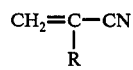

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile is acrylonitrile.

The vinyl aromatic monomers useful in this invention include styrene, alpha-methyl styrene, the vinyl toluenes, the vinyl xylenes, and the like. Most preferred is styrene.

Indene (1-H-indene) and coumarone (2,3-benzofuran) and mixtures are useful. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is by emulsion or suspension polymerization in an aqueous medium. The polymerization is carried out in an aqueous medium in the presence of an emulsifier and/or suspending agent and a free-radical generating polymerization initiator at a temperature of from about 0° to 100° C in the substantial absence of molecular oxygen.

The rubbery polymers useful in the present invention are homopolymers of the conjugated diene monomers mentioned above as well as copolymers of these monomers with another monomer component such as acrylonitrile, styrene, ethyl acrylate, and mixtures thereof, wherein there is present at least 50% by weight of the total monomers of the conjugated diene monomer.

The preferred polymeric compositions embodied herein are those resulting from the polymerization of (A) from about 25 to 70% by weight of at least one nitrile having the structure

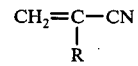

wherein R has the foregoing designation, (B) from about 15 to 70% by weight of styrene, and (C) from about 5 to 20% by weight of indene, wherein the given percentages of (A), (B) and (C) are based on the combined weights of (A), (B) and (C) in the presence of from 1 to 40 parts by weight of (D) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

More specifically, the present invention can be illustrated in the polymerization of acrylonitrile, styrene and indene in the presence of a preformed rubbery copolymer of butadiene and acrylonitrile to produce a product having excellent impact strength and improved ASTM heat-distortion temperature.

The preferred rubbery copolymers of butadiene and acrylonitrile contain more than 50% by weight of polymerized butadiene based on the total weight of combined butadiene and acrylonitrile. More preferably, the rubbery copolymer of butadiene and acrylonitrile should contain from 50 to 90%, and most preferably 60 to 80%, by weight of polymerized butadiene.

It is also preferred that from 1 to 40, and more preferably 1 to 20, parts by weight of the rubbery diene polymer be employed for each 100 parts of combined olefinically unsaturated nitrile, vinyl aromatic and indene. It has generally been found that as the relative amount of the rubbery diene polymer is increased in the final polymeric product, the impact strength increases and the gas and vapor barrier properties decrease somewhat. It is generally preferred to use just enough of the rubbery diene polymer to impart the desired impact strength to the polymeric product and to retain the optimum gas and vapor barrier properties in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact strength and low permeability to gases and vapors make them useful in the packaging industry, and they are particularly useful in the manufacture of bottles, film, sheets, and other types of containers and packages for liquids and solids.

In the following illustrative examples, the amounts of ingredients are expressed in parts by weight unless otherwise specified.

EXAMPLE 1

A. A rubber latex was prepared using the following ingredients and procedure:

| Ingredient | Parts |
| --- | --- |
| butadiene | 70 |
| acrylonitrile | 30 |
| soap flakes | 1.4 |
| water | 200 |
| Daxad 11 (sodium polyalkyl naphthalene | 0.1 |

| Ingredient | Parts |
| --- | --- |
| sulfonate—Dewey & Almy) | |
| Versene Fe-3 (sodium salt of diethanol-glycine—Dow Chemical Company) | 0.05 |
| t-dodecyl mercaptan | 0.65 |
| azobisisobutyronitrile | 0.4 |

The polymerization was carried out in a stirred polymerization reactor under nitrogen at a temperature of 50° C to about 90% conversion. The resulting latex was stripped of volatiles at reduced pressure at 33° C for 2 hours.

B. A portion of the rubber latex described in A above was used in the preparation of an acrylonitrile-styrene-indene resin from the following ingredients:

| Ingredient | Parts |
| --- | --- |
| acrylonitrile | 40 |
| styrene | 50 |
| indene | 10 |
| latex from A above (solids basis) | 15 |
| water | 220 |
| Gafac RE-610* (emulsifier) | 2.0 |
| limonene dimercaptan | 0.04 |
| t-butyl peroxy pivalate | 0.30 |

*A mixture of R—O—(CH$_2$CH$_2$O—)$_n$PO$_3$M$_2$ and [R—O—(CH$_2$CH$_2$O—)$_n$]$_2$PO$_2$M wherein n is a number of from 1 to 40, R is an alkyl or alkaryl group and preferably a nonyl phenyl group, and M is hydrogen, ammonia or an alkali metal, which composition is sold by GAF Corporation.

The polymerization was carried out at pH 7 using dilute aqueous KOH solution to obtain this pH with constant agitation in an atmosphere (nitrogen) substantially free of oxygen for 16 hours at 60° C. The resulting latex was coagulated with hot aqueous aluminum sulfate solution, the crumb was washed with water and methanol and dried in a vacuum oven. The dried polymer was found to have an ASTM heat-distortion temperature (D-64A, 264 psi) of 101° C, an Izod impact strength (ASTM D-256) of 0.81 foot pounds per inch of notch, ASTM D-790 flexural strength of 10.4 × 10³ psi, and ASTM D-638 tensile strength of 6.83 × 10³ psi.

C. The procedure of B above was repeated except that a weight ratio of 45:40:15 styrene:acrylonitrile:indene was used. The resulting polymer had the following properties: ASTM heat-distortion temperature 101° C, Izod impact strength 1.14 foot pounds per inch of notch, flexural strength 10.2 × 10³ psi, tensile strength 6.93 × 10³ psi, and Brabender plasticorder torque of 1800 meter grams at 220° C and 35 rpm.

D. The procedure in B above was repeated except that a weight ratio of 50:50 styrene:acrylonitrile and no indene was used to prepare a resin which is outside the scope of this invention. The resulting resin had the following properties: ASTM heat-distortion temperature 96° C, Izod impact strength 0.15 foot pounds per inch of notch, and flexural strength 5.84 × 10³ psi.

EXAMPLE 2

A series of polymers were prepared according to the procedure of Example 1B. The weight ratio of styrene:acrylonitrile:indene was varied. The resins produced and some of their properties are given in the following table.

TABLE

| Monomer Charge (Parts) | | | ASTM Heat-Distortion Temperature | Izod Impact Strength |
| --- | --- | --- | --- | --- |
| Styrene | Acrylonitrile | Indene | | |
| 70 | 25 | 5 | 90° C | 0.84 |
| 60 | 35 | 5 | 96° C | 1.44 |
| 35 | 50 | 15 | 101° C | 0.92 |
| 30 | 50 | 20 | 101° C | 0.93 |
| 25 | 60 | 15 | 98° C | 4.58 |
| 15 | 70 | 15 | 98° C | 5.89 |

EXAMPLE 3

A. A rubbery copolymer of butadiene:styrene 75:25 was prepared by the procedure of Example 1A.

B. A portion of the rubber latex from A of this example was used in the emulsion polymerization of styrene, acrylonitrile and indene using the following ingredients:

| Ingredient | Parts |
| --- | --- |
| acrylonitrile | 40 |
| styrene | 45 |
| indene | 15 |
| rubber latex A (solids basis) | 15 |
| water | 220 |
| Gafac RE-610 | 2.0 |
| t-butyl peroxy pivalate | 0.30 |

The polymerization was carried out with constant stirring in a nitrogen atomsphere for 25 hours at 60° C. The resulting latex was coagulated and worked up as in Example 1B. The dried polymer had the following properties: ASTM heat-distortion temperature 101° C, Izod impact strength 1.04 foot pounds per inch of notch, flexural strength 9.65 × 10³ psi, tensile strength 6.6 × 10³ psi, Brabender plasticorder torque 1800 meter grams at 220° C and 35 rpm.

C. The procedure of B of this example was repeated except that a polymerization temperature of 45° C and a polymerization time of 41 hours were employed. The resulting polymer was found to have the following properties: ASTM heat-distortion temperature 100° C, Izod impact strength 2.94 foot pounds per inch of notch, flexural strength 8.17 × 10³ psi, and tensile strength 5.10 × 10³ psi.

D. The procedure in B of this example was repeated except that the rubber was omitted from the ingredients. The resulting resin, which is outside the scope of the present invention was found to have an Izod impact strength of 0.15 foot pounds per inch of notch.

I claim:

1. The polymeric composition resulting from the polymerization of a mixture consisting essentially of 100 parts by weight of A from about 25 to 70% by weight of at least one nitrile having the structure

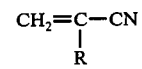

wherein R is hydrogen, a lower alkyl group having from 1 to 4 carbon atoms, or a halogen, B from about 15 to 70% by weight of styrene, and C from about 5 to 20% by weight of indene wherein the given percentages of (A), (B) and (C) are based on the combined weights of (A), (B) and (C) in the presence of from 1 to 40 parts by weight of D. a rubbery polymer of at least 50% by weight of a conjugated diene monomer selected from the group consisting of butadiene and isoprene and up to 50% by weight of at least one member selected from the group consisting of a styrene, acrylonitrile, and ethyl acrylate.

2. The composition of claim 1 wherein (A) is acrylonitrile.

3. The composition of claim 2 wherein (D) is a copolymer of butadiene and acrylonitrile.

4. The composition of claim 2 wherein (D) is a copolymer of butadiene and styrene.

5. The process comprising polymerizing in an aqueous medium in the presence of a free-radical initiator and in the substantial absence of molecular oxygen a mixture consisting essentially of 100 parts by weight of A. from about 25 to 70% by weight of at least one nitrile having the structure

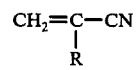

wherein R is hydrogen, a lower alkyl group having from 1 to 4 carbon atoms, or a halogen, B. from about 15 to 70% by weight of styrene, and C. from about 5 to 20% by weight of indene wherein the given percentages of (A), (B) and (C) are based on the combined weight of (A), (B) and (C) in the presence of from 1 to 40 parts by weight of D. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate and recovering the polymeric resinous product.

6. The process of claim 5 wherein (A) is acrylonitrile.

7. The process of claim 6 wherein (D) is a butadiene-acrylonitrile rubber.

8. The process of claim 6 wherein (D) is a butadiene-styrene rubber.

* * * * *